UNITED STATES PATENT OFFICE.

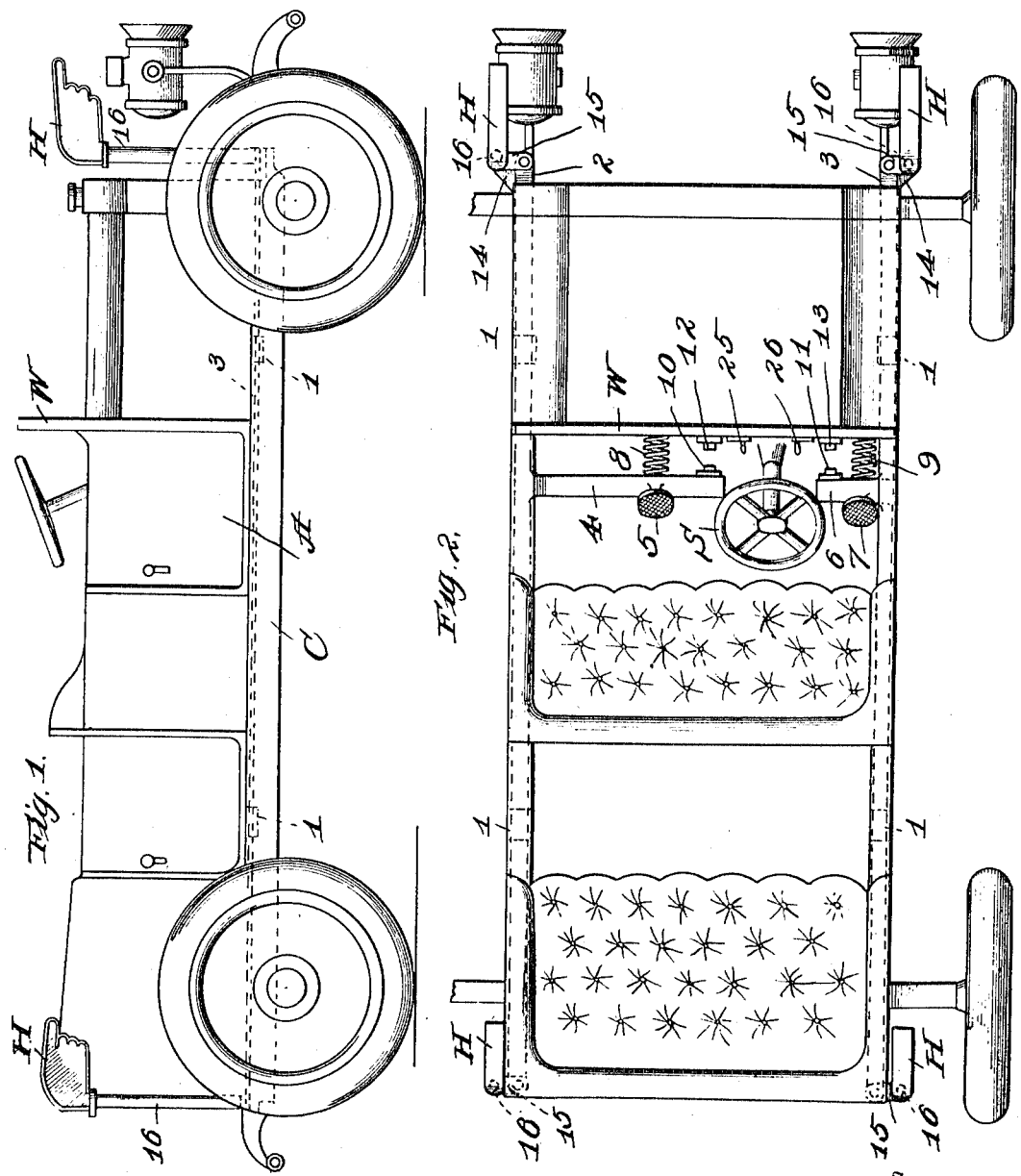

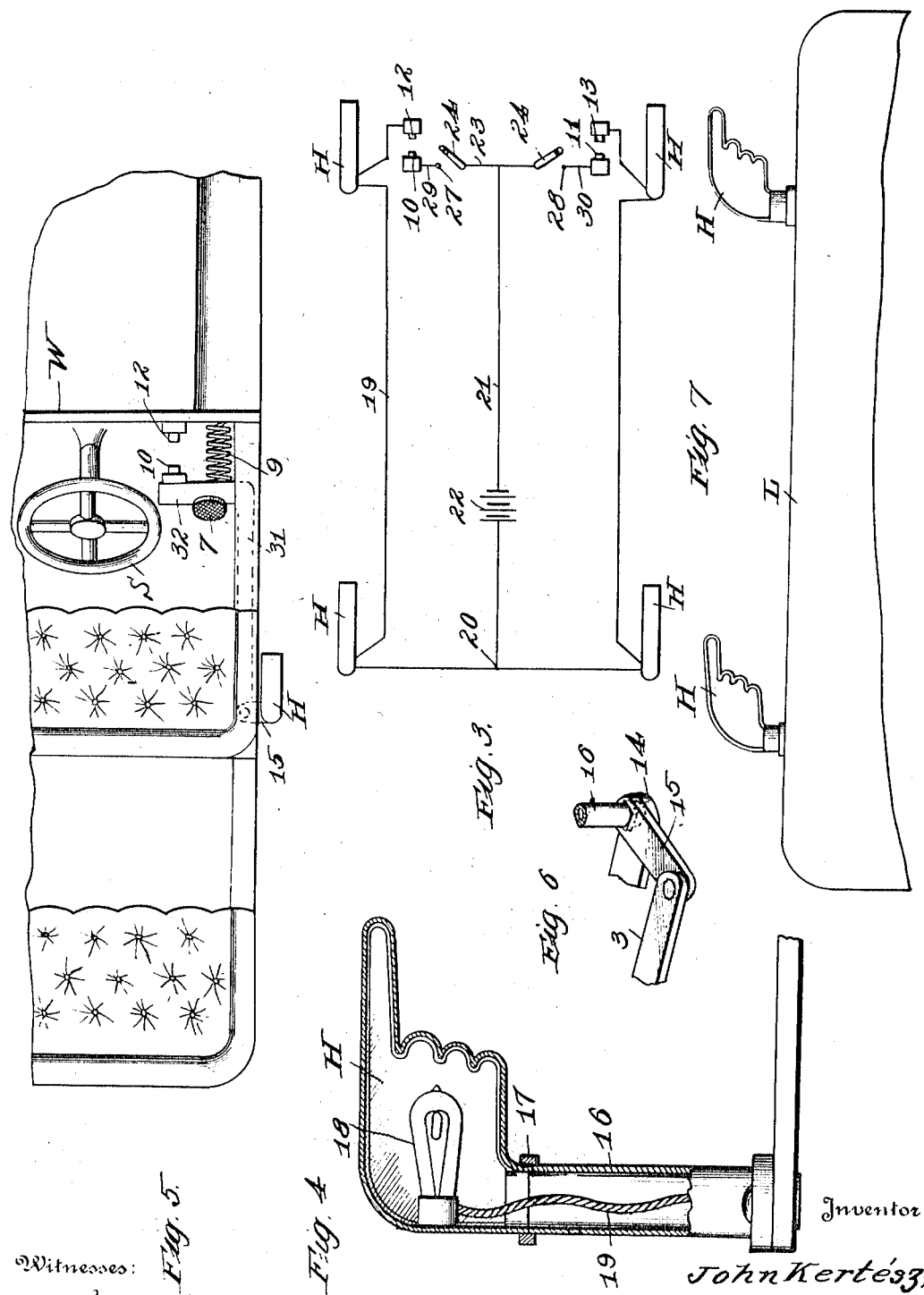

JOHN KERTÉSZ, OF WOODBRIDGE, NEW JERSEY.

AUTOMOBILE-SIGNAL.

1,117,398.   Specification of Letters Patent.   Patented Nov. 17, 1914.

Application filed November 1, 1913. Serial No. 798,678.

*To all whom it may concern:*

Be it known that I, JOHN KERTÉSZ, a subject of the King of Hungary, residing at Woodbridge, in the county of Middlesex and State of New Jersey, have invented certain new and useful Improvements in Automobile-Signals, of which the following is a specification.

This invention relates to automobile attachments.

The object of the invention is, in a ready and practical manner, to enable the chauffeur to display a signal or signals visible either by day or night, to warn the driver of a machine approaching from the rear, that the chauffeur of the first machine is going to make a turn, the signal or signals having a distinctive shape to indicate in which direction the first machine intends to turn.

With the above and other objects in view, as will appear as the nature of the invention is better understood, the same consists in the novel construction and arrangement of parts of an automobile signal, as will be hereinafter fully described and claimed.

In the accompanying drawings, forming a part of this specification, and in which like characters of reference indicate corresponding parts: Figure 1 is a view in side elevation exhibiting an automobile equipped with the improvements of the present invention. Fig. 2 is a top plan view of the same. Fig. 3 is a diagrammatic view exhibiting the electric circuits for operating the signals. Fig. 4 is an enlarged detail view, in section, of one of the signaling devices. Fig. 5 is a top plan view of a slightly modified form of the invention. Fig. 6 is a perspective detail view of a part of the device. Fig. 7 is a fragmentary detail view of another modified form of the apparatus.

Referring to the drawings, A designates, generally, an automobile which may be of any usual or preferred construction, and C the chassis thereof, and as these parts form no part of the present invention, they are simply exhibited to show the manner in which the improvements are applied, and further description is deemed unnecessary.

Working in suitable guides 1 arranged on the chassis, and indicated by dotted lines in Figs. 1 and 2, are two rods or bars 2 and 3, the bar 2 having intermediate of its ends an arm 4 which extends at right angles to the bar 2 and is provided adjacent to its inner end with a foot piece 5, the bar 3 having a similar arm 6 disposed in transverse alinement with the arm 5 and carrying a foot piece 7. Interposed between the arms 4 and 6 are two coiled springs 8 and 9, the inner end of each of which bears against the respective bars, preferably opposite the foot pieces, the other ends of the springs bearing against the front wall W of the driver's compartment in which is arranged the ordinary steering wheel S. The arm 4 carries a contact 10 and the arm 6 a similar contact 11, and these two contacts are designed to co-act with contacts 12 and 13 secured to the wall W, as clearly shown in Fig. 2.

Secured to the chassis or to the front and back of the frame of the machine, and on the under side thereof, at each of the four corners, is a bracket 14, more clearly shown in Fig. 6, to each of which is pivoted one end of a link 15, the other end of each of which is pivotally-connected with one of the terminals of the rods or bars 2 or 3. Rigidly secured to each of the links is an arm or upright 16, each of which carries at its upper end a signal H in the form of a human hand, with the index finger extended, the hand as a whole being transparent and being detachably-secured to the standard 16 as by a collar 17. Arranged within the hand or indicator is an incandescent lamp 18, with which connects one end of an ordinary conductor 19, which is common to all four of the lamps, as shown in the diagrammatic view, Fig. 3, the terminals of the conductor being secured to the contacts 12 and 13.

Tapped into the conductor at 20 is one end of a branch conductor 21 including a battery 22, either of the primary or storage type as may be preferred, the other end of the branch conductor being tapped into a cross conductor 23 having at each end a switch 24 that is designed to be operated by switch handles 25 and 26 arranged on the front wall of the driver's compartment. These switches 24 are designed to be shifted into and out of engagement with contact points 27 and 28 carried by wires 29 and 30 that connect respectively with the contacts 10 and 11.

Normally, the signals H occupy a plane parallel with the longitudinal axis of the automobile, and so remain as long as the machine is running forward or is standing still. Now, should the chauffeur desire to notify an approaching machine that he is going to turn to the left, he will press upon the foot piece 5 and this will force the bar 2 in a forward direction and swing the two indicators on the left hand side of the automobile outward at an angle to such position as to render them clearly visible to the approaching machine. Should the machine be running in the night, the switches 24 will be brought into engagement with the contacts 27 and 28 so that when, in the event that the machine is running in the night and the chauffeur shifts the bar 2 in the manner described, the contacts 10 and 12 will be brought into engagement with each other and will cause the lamps in the two indicators on the left hand side of the machine to glow and thus give a positive signal, while in the day-time the peculiar configuration of the signals will attract attention, and notify the driver of the approaching machine in which direction the advance machine is going to turn. The operation just described is true of the mechanism on the right hand side of the machine. In some instances, it may be desired merely to have two signals, these being arranged intermediate of the length of the car, and preferably adjacent to the driver's seat as shown in Fig. 5, in which case, as will be obvious, the operating bar 31 will only extend from the arm 32 back to the link 15 of the signals H. As shown in Fig. 7, the indicators may be located on the top of the roof of a limousine L.

From the foregoing description, it will be seen that by the arrangement of the mechanism employed, the positive operation of a signal or signals upon an automobile may be effected, and the same rendered equally adaptable for securing the object sought by day as well as by night.

What I claim as new and desire to secure by Letters Patent of the United States is:—

The combination with the chassis of an automobile, of a signal device comprising a longitudinally guided shiftable bar at each side of the chassis, laterally extending arms projecting from said bars, springs between said arms and the front wall of the driver's compartment, brackets projecting from the corners of the chassis, links each pivotally secured at one end to one of said brackets and at its opposite end to one of said bars, uprights on said links and signals supported upon said uprights.

In testimony whereof I affix my signature in presence of two witnesses.

JOHN KERTESZ.

Witnesses:
 SIPO SAJOS.
 JOHN ZILOU.